Inventor
Charles R. Kilgore

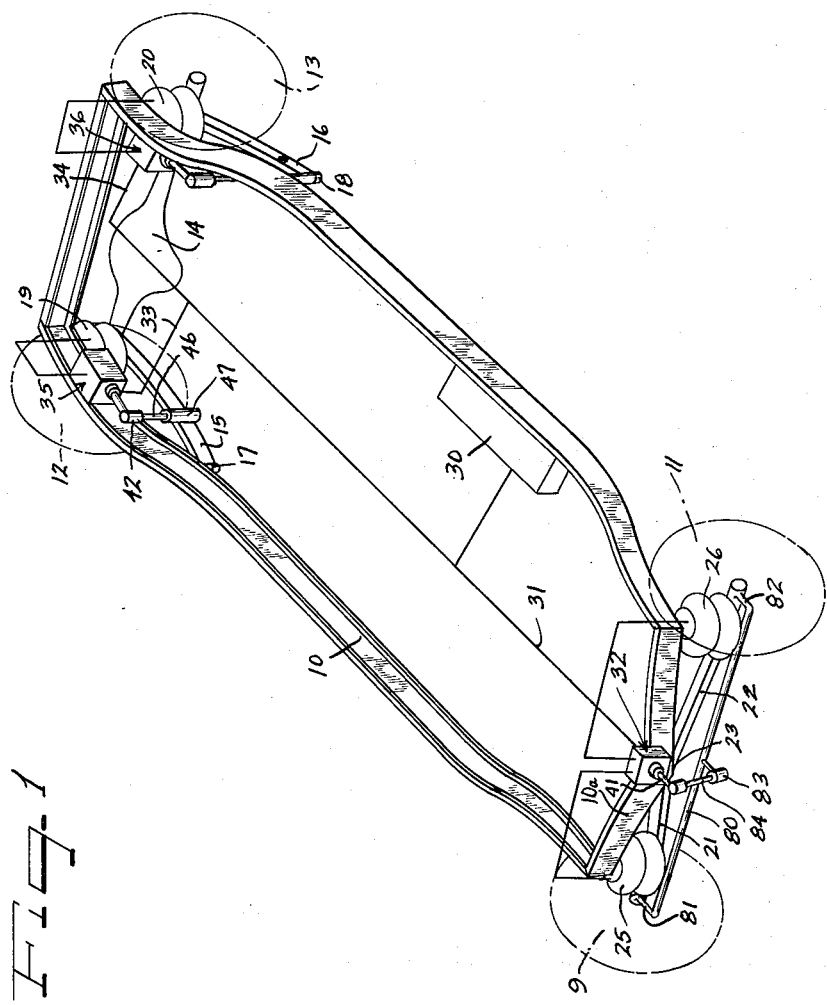

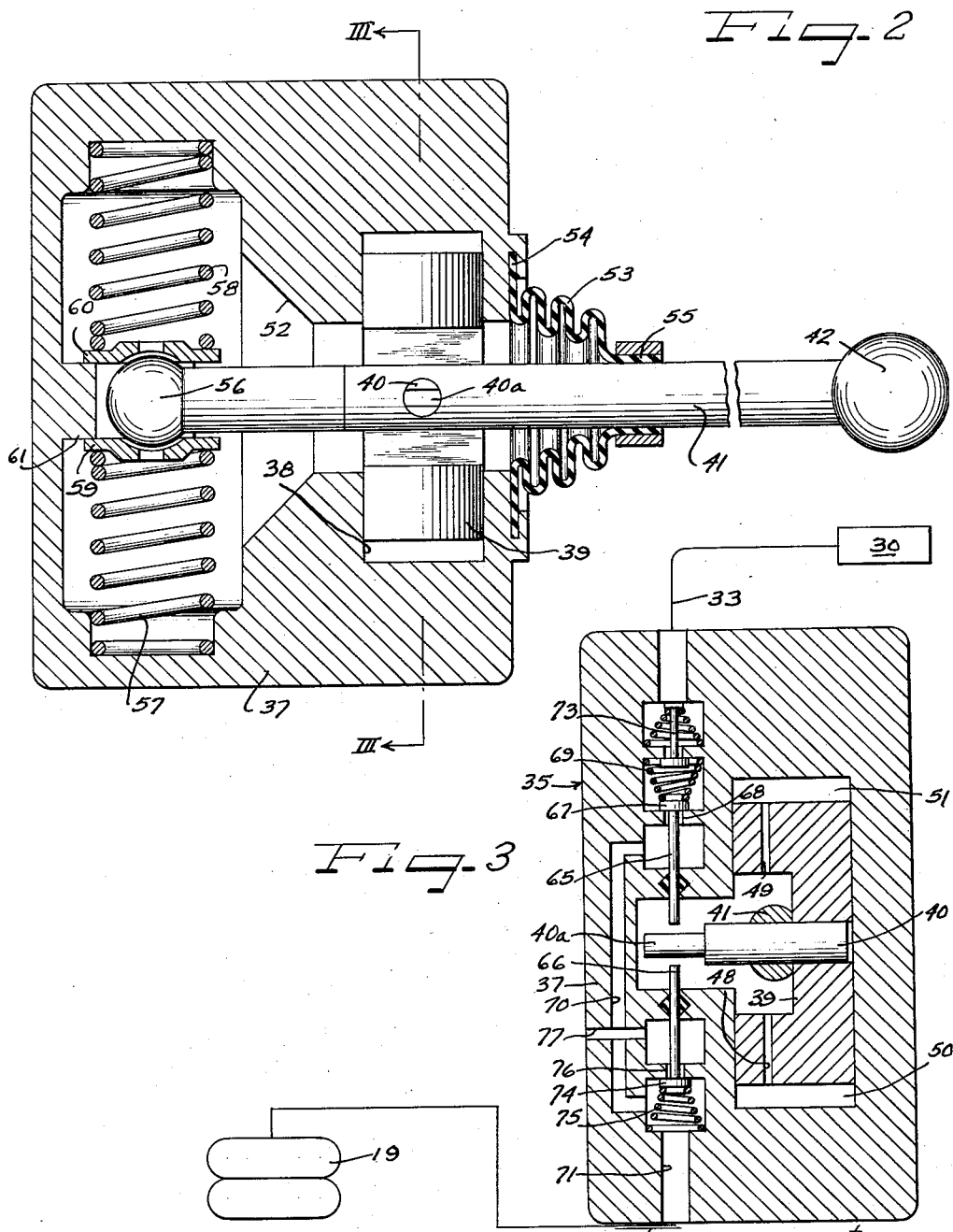

United States Patent Office 2,993,706
Patented July 25, 1961

2,993,706
LEVER ACTUATED LEVELING VALVE HAVING RESILIENTLY CENTERED MOVABLY MOUNTED FULCRUM
Charles R. Kilgore, Cleveland, Ohio, assignor to Thompson Ramo Wooldridge Inc., a corporation of Ohio
Filed May 24, 1957, Ser. No. 661,403
8 Claims. (Cl. 280—124)

The present invention relates to suspension systems for automotive vehicles, and, more particularly, is concerned with the provision of a novel and substantially improved means for effectively controlling the height of the vehicle frame relative to the rod surface in a manner permitting adjustment of height upon changes in load on the vehicle without at the same time causing adjusting as a result of transient forces applied to the suspension system.

I am, of course, aware that numerous leveling systems have been provided for automotive vehicles, and the like, in an effort to arrive at a truly simple and low-cost leveling system which is sufficiently selective in the elimination of leveling functions upon the application of transient forces, such as road bumps, or the like, to the vehicle suspension system. However, such prior systems have, if functionally satisfactory, been excessively expensive. Further, in prior art systems with which I am familiar leveling has ordinarily been accomplished at each of the vehicle wheel springs individually or, where a single leveling control valve is provided for a pair of vehicle wheel springs of the pneumatic type, the prior systems have failed to provide the necessary spring isolation.

According to the present invention, a vehicle suspension system is provided in which a separate pneumatic spring is provided for supporting the frame relative to each wheel. Each of the rear wheel pneumatic springs is controlled by a separate leveling valve deriving a leveling sense at a point immediately thereadjacent. The front wheel springs, on the other hand, are controlled by separate valves combined in a single housing which, instead of deriving control from points immediately adjacent the individual front wheels, are actuated by a single actuating member which reflects the average level of the front of the vehicle. Through the utilization of complete separate valves for the two front wheel springs, the pneumatic springs are maintained completely separate from each other and at the same time an average leveling condition is achieved. This permits elimination of the condition commonly known as "duck-walk" (described more fully below) while at the same time maintaining complete independence of the individual front wheel springs.

The present invention contemplates provision of such an improved system through utilization of an extremely simple leveling valve which may be provided in the form of a single or double leveling valve with a minimum of change in operating parts. At the same time, through construction of the individual leveling valves in the manner contemplated by the present invention, an improved valve action is provided having very high selectivity in providing leveling for changes in vehicle load without at the same time providing leveling changes upon the application of transient suspension forces. In accomplishing this improvement, the present invention contemplates the provision of a novel leveling valve having the actuating lever thereof directly pivotally connected to a wheel axle or directly related component without the presence of a resilient connection employed in previous systems. The actuating lever is directly pivoted, in turn, to a valve actuating pin positioned between opposed pneumatic spring-controlling valves for actuation thereof upon transverse movement of the pin. Transverse movement of the pin is retarded by means of a dashpot directly secured to the pin and the actuating lever carried by the pin is constrained by a centering spring positioned at the end thereof opposite from the point of connection with the vehicle suspension. As a result of this arrangement, rapid oscillations of the vehicle suspension, such as occur when the vehicle passes over a rough road, will cause the actuating lever to oscillate about the valve actuating pin, with the spring centered end of the lever moving against the force of the centering spring. However, upon the application of a load change to the vehicle suspension, the actuating lever will, in the main, pivot about the end thereof centered by the centering springs, with the valve actuating pin being moved slowly transversely of its axis into engagement with one or the other of the vehicle spring controlling valves.

As a result of the arrangement above set forth, large oscillations of the valve actuating lever may occur without affecting the leveling valves unless the actuating lever maintains a position of oscillation for an extended period of time. In this latter event, the centering springs become the fulcrum of the actuating lever and the central pivot of the actuating lever moves transversely a sufficient distance to actuate a leveling valve. It will be noted, of course, that by positioning the center fulcrum of the actuating lever at the valve actuating position and the end fulcrum of the lever at the centering springs, a relatively small movement of the valve actuating pin occurs with a change in position of the actuating lever thereby permitting extremely accurate valving. This arrangement is preferred, although as will be described below, the respective valve actuating and spring centering fulcrums can be reversed, if desired.

It is, accordingly, an object of the present invention to provide an improved and simplified vehicle suspension leveling system having three points of control for four independent pneumatic leveling springs.

Another object of the present invention is to provide a simplified and yet highly selective leveling valve unit for vehicle suspensions.

Still a further object of the present invention is to provide a leveling valve unit for vehicles having a minimum number of parts constructed for interchangeability in either a single or dual leveling valve unit.

Yet a further object of the present invention is to provide a leveling valve having a floating lever provided therein and capable of selectively moving either an overtravel centering spring or a leveling valve element depending upon the period of time over which the floating lever is actuated in a given direction.

A feature of the invention resides in the provision of a pair of leveling valves in a single housing for simultaneous actuation by a single floating lever without providing fluid interconnection between the two valves whereby an average leveling input signal may be applied to a plurality of pneumatically independent vehicle suspension springs.

Another feature of the invention resides in the provision of four completely independent pneumatic vehicle springs under the control of three leveling input signal members.

Still a further object of the present invention is to provide a novel and improved leveling valve assembly readily adaptable to utilization in a vehicle leveling system having either four independently actuated leveling valves with four leveling input signals or, alternatively, three leveling input signals.

Still other and further objects and features of the present invention will become apparent to those skilled in the art from a consideration of the attached drawings wherein preferred embodiments of the present invention are shown by way of illustration only, and wherein:

FIGURE 1 is a diagrammatic isometric view of a vehicle frame and suspension system incorporating the leveling system of the present invention;

FIGURE 2 is an elevational view in cross-section, of a leveling valve unit of the present invention as applied to a rear wheel of the vehicle;

FIGURE 3 is a cross-sectional view through the leveling valve applied to the rear wheels, and taken along the line III—III of FIGURE 2;

As shown on the drawings:

Figure 4:
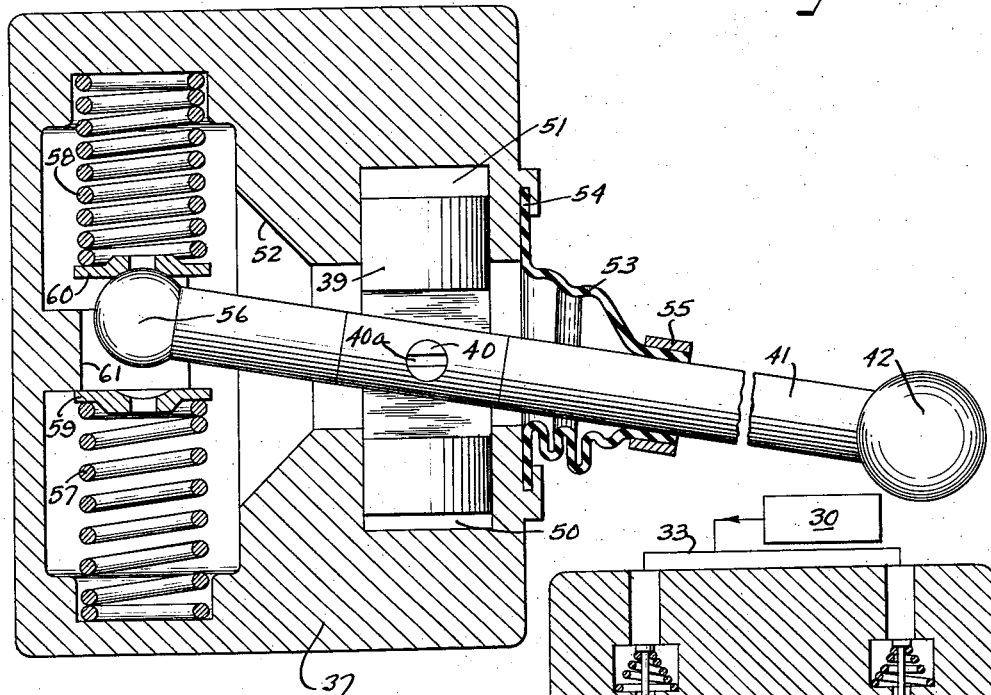
FIGURE 4 is a view corresponding to the view in FIGURE 2 with the parts in one position of operation.

In the diagrammatic illustration of a vehicle frame shown in FIGURE 1, the frame is indicated at 10 and may take any conventional form. In the arrangement shown, the vehicle is provided with front wheels 9, 11 and rear wheels 12, 13. The actual suspension components and type of drive of the vehicle may be any conventional form desired but for purposes of illustration the rear wheels are shown suspended on a rear axle unit 14 supported at its ends by trailing links 15 and 16 pivotally secured at the vehicle frame 10 at 17 and 18, respectively, for oscillation in a generally vertical plane relative thereto. Pneumatic springs 19 and 20 are positioned between the frame 10 and the respective trailing links 15 and 16, respectively, and provide a resilient support for the frame 10 on the rear wheels.

In the illustration of FIGURE 1, the front wheels 9 and 11 are carried by respective independently movable axle members 21 and 22 pivoted relative to the frame cross member 10a as at 23 for movement in a generally vertical plane lying transverse to the longitudinal axis of the vehicle. Pneumatic springs 25 and 26 are positioned between the frame cross member 10a and the respective axles 21 and 22 and individually support the frame 10 relative to the respective front wheels 9 and 11.

As those skilled in the art of vehicle suspension are aware, a great number of satisfactory pneumatic spring units, per se, have been developed and at least a few of these designs have been commercially employed in vehicles. For purposes of the present invention, substantially any form of fluid spring in which the fluid is compressible, may be employed. In the present instance the springs, 19, 20, 25 and 26 are pneumatic and are supplied by means of an air pressure reservoir 30 maintained under pressure by means of a compressor, or the like, not shown. Compressed air from the reservoir 30 is passed via conduit 31 to a wheel leveling valve generally indicated at 32 and via conduits 33 and 34 to respective rear wheel leveling valves 35 and 36 supplying the respective springs 19 and 20.

As above discussed, the leveling valves 35 and 36 controlling the rear wheel springs are unitary as compared with the dual leveling unit 32 applied to the front wheel springs. This unitary leveling valve structure is more clearly shown in FIGURES 2, 3 and 4. There, a leveling valve generally indicated at 35 is provided with a housing 37 having a generally vertically extending bore 38 therein. A piston 39 is slidably mounted within the bore and carries an actuating pin 40 transversely thereof. The actuating pin 40 pivotally carries an operating or actuating lever 41 which extends outwardly of the housing for pivotal connection at a joint 42 with the trailing link 15 of the vehicle suspension, through a link 46 pivotally secured with the trailing link at 47. As a result of the pivotal connection of the lever 41 with the trailing link 15, up and down movements of the rear wheel 12 will be reflected in simultaneous vertical movements of the end 42 of the lever 41.

The pivot pin 40, carried by the piston 39, is permitted to move gradually relative to the housing 37. This movement is controlled by means of orifices 48, 49 in the piston 39. The orifices 48, 49 control the flow of liquid or other damping fluid back and forth from the chambers 50 and 51 and provide a substantial restriction on such movement. In the arrangement shown in the drawings, the chambers 50 and 51, as well as the main cavity 52 in the housing 37 are shown sealed from the outside of the housing by means of a flexible boot 53 tightly secured to the housing 37 at 54 and to lever 41 at 55. Accordingly, it will be understood that the cavities 50, 51 and 52 may be completely filled with a liquid, if desired, thereby providing a liquid dashpot arrangement.

The end 56 of the lever 41 is resiliently centered relative to the housing 37 by means of a pair of opposed springs 57 and 58 which act to bias respective spring seats 59 and 60 against a centering stop abutment 61 in a manner to resiliently bias the end 56 of the lever 41 into a centered position relative to the stop 61. This relationship is clearly illustrated in FIGURE 2.

As a result of the spring centering arrangement at the end 56 of lever 41, coupled with the slowly movable pivot pin 40 for the link 41, two different types of movement of the lever 41 are accomplished, depending upon the type of force applied to the end 42 thereof. Thus, if a rapid movement occurs at the end 42, as a result of the variation of the contour of the road surface over which the vehicle is traveling, the lever 41 will pivot about the pin 40 unseating one or the other of the spring seats 59 and 60. If the movement of the end 42 of the lever 41 away from the centered position of FIGURE 2 is only instantaneous, as it would be in the case of road undulations, the restricted orifices 48 and 49 of the piston 39 would prevent movement of that piston before the force applied to the lever 42 is released. Accordingly, under instantaneous, transient, load applications to the lever 41, the lever will pivot about the pin 40 substantially as if the pin 40 were fixed relative to the housing 37. With such pivotal motion of the lever 41, the springs 57 and 58 will be compressed and will, at all times provide a biasing force against the end 56 of lever 41 tending to return the lever to its centered position shown in FIGURE 2. This situation is shown in FIGURE 4.

In the event that the load on the vehicle frame 10 is changed, a relatively long term force is applied to the end 42 of the lever 41 since the trailing link 15 will move upwardly toward the frame 10 with additional compression of the spring 19. This movement will initially cause the lever 41 to pivot around the pivot pin 40 in the manner above described. In the case of an additional load on the frame 10, the lever 41 will pivot counterclockwise relative to the pin 40 as viewed in FIGURE 2, forcing the spring seat 59 downwardly against the forces of spring 57. With the continued presence of the additional load on the frame 10, fluid in the chamber 51 will flow through the restricted orifice 49 and fluid in the cavity 52 will flow into the chamber 50 via orifice 48 permitting the movement of the piston 39 upwardly. This gradual upward movement is induced by the force of the spring 57 acting against the end 56 of lever 41 and continues till such time as the spring seat 59 abuts against the stop 61 and the end 56 of the lever 41 is centered. With movement of the piston 39, however, valve actuation occurs to introduce additional air under pressure into the spring 19 causing the spring to expand, thereby moving the end 42 of the lever 41 downwardly toward the level position. Spring 58 is compressed by end 56 as lever 41 moves about pivot 40 and this forces piston 39 downwardly closing valve 65. The lever 41 returns to the neutral, or central, position as the spring cap 60 contacts its seat.

The control of fluid under pressure to the spring 19 is clearly shown in FIGURE 3. There, the pin 40 is shown to have a projection 40a extending between a pair of opposed valve stems 65 and 66. The valve stem 65 carries a head 67 closing an orifice 68 under the influence of a spring 69. The orifice 68 connects conduit 33, from the reservoir 30, to an intermediate conduit 70 and from thence to leveling valve outlet 71 and spring 19. Accordingly, when pin 40 is moved upwardly, as above described, valve stem 65 will be moved upwardly unseating valve head 67 and permitting air under pressure to pass to the spring 19. Instantaneous impact pressures built up in the spring 19 are prevented from passing back into the reservoir 30 against the force of the spring 69 by means of a one-way check valve 73.

Any movement of the pin 40 downwardly, which would occur when a previously applied load on the frame 10 is removed, will cause downward movement of the valve stem 66 with a corresponding movement of the valve head 74 against spring 75. This movement opens the orifice 76 permitting air to pass from the pneumatic spring 19 to an exhaust vent 77.

In the arrangement shown, it will be apparent that an effective means is provided for selectively actuating the control valves 65, 66 of the air spring 19 only when a continuously applied load change is encountered. When instantaneous or transient loads are applied to the lever 41, these loads are absorbed in the springs 57 and 58 without movement of the pin 40 to a sufficient degree to actuate the valve stems 65 or 66. However, upon a continued application of load, or upon continued lightening of load, the position of the pin 40 will move up or down, respectively, as the springs 57 and 58 tend to re-center the end 56 of lever 41. This movement of the pin 40 will cause either the addition of air under pressure to the spring 19 to raise the vehicle, or the removal of air from the spring 19 to lower the vehicle to its predetermined desired condition in which the lever 41 will be returned to a centered position in which the end 56 is centered relative to the stop 61 and the pin 40 is out of contact with either the valve stem 65 or the valve stem 66.

It will be apparent from the description above that the leveling valve unit 35 provides a simple yet extremely efficient leveling valve unit. The lever 41 which operates to sense the actual condition of the vehicle suspension is directly connected to the valve actuating pin 40, rather than being connected through a spring or other resilient device capable of deterioration. Although springs 57 and 58 may in the course of time change their spring constants, this cannot seriously affect the operation of the valve of the present invention since the presence of only a moderate spring force at 57 or 58 will suffice to compress the springs 69, 75 to cause a leveling operation upon a continued change in level of the spring suspension of the vehicle. Further, the arrangement herein provided offers a simple unit having a low-cost time delay or dashpot means directly associated with the valve actuating pin 40 in a simple manner. As a result of the direct connection of the sensing lever 41 with the pin 40 and the direct application of the delaying force to the pin 40, without the utilization of any immediate links, extreme accuracy in the construction of the valve may be obtained, relative to the opening of valve stems 65 and 66. This accuracy may easily be maintained in mass production and at low cost.

It will, of course, be understood that the leveling valves 35 and 36 are essentially identical. As a result, the level of the individual rear wheels is separately sensed and separately controlled by the application of fluid under pressure to the individual rear springs 19 and 20. Separate leveling valves can likewise be applied to the front vehicle wheels, if desired. However, an important practical disadvantage has been discovered relative to the utilization of four leveling valves combination with four pneumatic springs and four separate wheel position sensing elements. This objection is that an automotive vehicle can, under circumstances, achieve a "level" condition, as far as the valve sensing means are concerned, where diagonally opposed wheels, such as for example, the front left and right rear are at one level while the other diagonally opposed wheels are at some different, higher level relative to the frame. This condition causes what is known in the automotive industry as "duck-walk" and provides a situation in which the vehicle may oscillate very slightly about a diagonal axis without causing a re-leveling of the individual wheels. In order to obviate any such possibility, the present invention contemplates the provision of one average sensing element in this system. For convenience sake, this is provided at the front vehicle wheels and provides an average vehicle height sensing value which then operates to control simultaneously, but separately, the two front wheels.

As shown in FIGURE 1, in diagrammatic form, a front stabilizer bar 80 is provided. The bar 80 is provided with rearwardly deflected arms 81 and 82 pivotally connected with the respective front wheel axes 21 and 22. The bar 80 is constructed of a resilient material, such as spring steel, and is carried in bearings secured rigidly relative to the frame cross member 10a for rotation about the axis of the intermediate bar portion 80. Such bearings may, of course, be secured to any part of the vehicle rigidly secured to the frame 10 and in order to avoid confusion in the diagrammatic view illustrated, such bearings are not shown. They may, however, be dependent from the cross member 10a in a convenient manner.

The bar is provided with a single sensing arm 83 radially extending therefrom for pivotal connection with vertically upstanding link 84 which is in turn pivotally connected to the outer end of a leveling valve lever 41 of the front leveling valve 32.

It will be apparent that the arm 83 of the stabilizer bar or rod 80 will reflect the average elevation of the wheel axles 21 and 22 relative to the frame cross member 10a. For example, if the axle 22 is raised relative to the longitudinal axis of the rod 80, which is fixed relative to the cross member 10a, and the axle 21 is lowered relative to the frame, substantially no oscillation of the arm 83 will occur. On the other hand, if both wheel axles 21 and 22 rise relative to the frame, the arm 83 will move upwardly, moving the lever 41 upwardly an amount equal to the average upward deflection of the axles 21 and 22.

Figure 5:
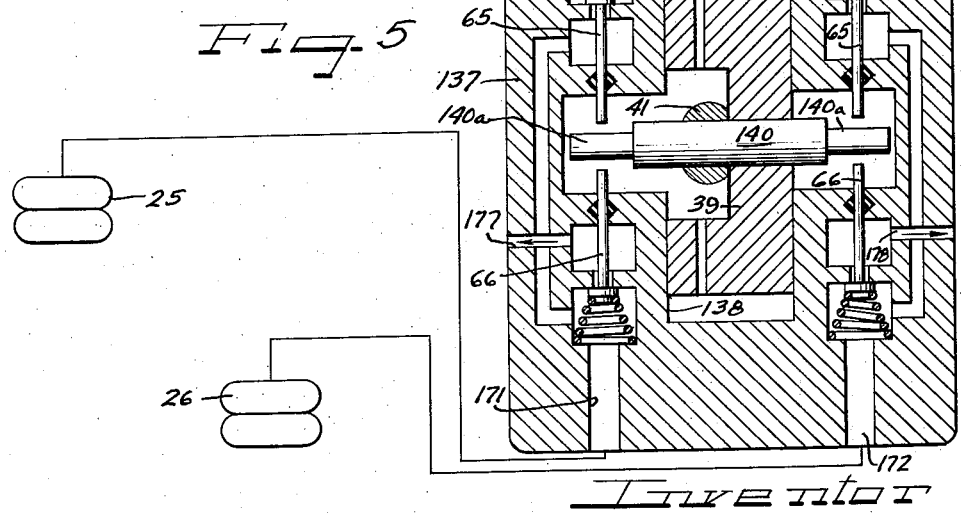
FIGURE 5 is a cross-sectional view of the form of the leveling valve employed with the front wheels of the vehicle.

The average value of the elevation of the two front wheels, as reflected in the position of the arm 83, is translated into independent and completely separate, though simultaneous, control of the fluid pressure in the two front springs 25 and 26. In accordance with the principles of the present invention, this is accomplished through a leveling valve 32 which is similar in construction to the leveling valve 35, above described, and identical thereto in operation. This valve structure is clearly seen from a consideration of FIGURE 5. As there shown, a housing 137 is provided with a bore 138 carrying a piston 39 preferably identical to the piston 39 shown in FIGURES 2 and 3. The lever 41 is pivotally mounted on a pin 140 having a pair of reduced diameter extensions 140a rather than the single extension 40a provided in connection with the single valve unit 35. As may be seen, upward movement of the lever 41, in the same manner described relative to the single valve unit, will cause unseating of the valve stems 65, permitting fluid under pressure to flow from the reservoir 30 via conduits 33, separate pressure inlet valves 65 to the outlets 171 and 172 leading, respectively, to the front springs 25 and 26. Likewise, downward movement of the lever 41 will act against the vent valves 66 to vent the respective springs 25 and 26 to atmosphere via vents 177 and 178. Although the cross-section taken in FIGURE 5 does not illustrate the springs 57 and 58 as applied to the front wheel leveling valve, it will be understood that they are essentially identical to the springs shown in FIGURE 2 and are associated with the lever 41 in the same way as above described relative to the single leveling valve device shown in FIGURE 2.

It will be apparent that apart from the dual-ended actuating pin 140 and the double housing 137, the front leveling valve unit may be composed of substantially identical parts as the leveling valves associated with the rear wheels. This permits low-cost maintenance as well as a reduction in the cost of the original parts which may be essentially standardized.

It will be appreciated that although movement of the actuating pin 140 operates two separate air inlet valves, for the respective front wheel springs 25 and 26, no hydraulic conduit interconnects the springs 25 and 26 within the leveling valve unit. Accordingly, it is impossible for air to be transferred from one front spring to the other during cornering or any other vehicle activity. This arrangement thereby precludes leveling instability forming a part of some other known three-point vehicle leveling systems.

While the leveling valves have been above described as controlling the flow of a gas to pneumatic springs, it will be clear that the valves may be employed to control the flow of pressurized liquid to a conventional hydro-pneumatic spring in which a confined gas is compressed to the desired, variable, degree by the pressurized liquid.

From the above description, it will be apparent that I have provided a novel and substantially improved vehicle leveling system as well as a low-cost and substantially improved leveling valve unit for use therein. The leveling valve unit provides an extremely accurate and sensitive valve which is fully selective to prevent valve operation during the application of transitory changes in load on the vehicle frame relative to the wheels and to cause the valve actuation upon the continued application of increased or decreased load to the frame. It will further be apparent to those skilled in the art that variations and modifications may be made in the specific structures illustrated without departing from the scope of the novel concepts of the present invention and it is, accordingly, my intention that the scope of the invention be limited solely by that of the hereinafter appended claims.

I claim as my invention:

1. In combination in a leveling system for vehicles, a vehicle frame, a wheel axle, a pneumatic spring supporting said frame over said axle, a valve for controlling the pneumatic pressure in said spring, said valve comprising a housing supported on the frame, a floating lever in said housing having one end thereof connected to said axle for oscillation therewith, a valve controlling the pressure in said spring, an element moving tranversely of said lever for unseating said valve and pivotally connected to said lever, spring means providing a fulcrum for said lever at a point remote from said element and remote from said one end and resiliently shiftable transversely of said lever, and means retarding movement of said element to prevent movement thereof to unseat said valve in response to movement of said one end of said lever unless said movement is continued for a predetermined length of time.

2. A leveling valve for controlling the flow of fluid under pressure to a fluid spring supporting a vehicle frame relative to a wheel axle comprising, a reciprocal actuating element movable to open at least one valve element controlling said flow, a dashpot directly connected to said actuating element for retarding movement thereof, an actuating lever pivotally secured to said actuating element, a fulcrum on said actuating lever and movable in a path generally parallel to the movement of said actuating element, spring means centering said movable fulcrum for floating movement relative to said frame, and means for applying a force to said lever generally parallel to the movement of said actuating element and at a point on the lever removed from said actuating element, in response to relative movement between said axle and said frame.

3. In a leveling valve for controlling the flow of gas under pressure to a pneumatic spring supporting a vehicle frame relative to a wheel axle, a housing fixedly secured to the frame, a reciprocal actuating element movable to open at least one valve element controlling said flow, a time delay dashpot directly connected to said element for retarding reciprocation thereof, an actuating lever pivotally secured to said actuating element, spring means resiliently centering one end of said lever relative to said housing but permitting floating movement of said lever relative to said housing in a plane generally parallel to the plane of said actuating element, and means for applying a force to the other end of said lever in a direction generally parallel to the path of movement of said actuating element in response to relative movement between said frame and said axle.

4. In a leveling valve for controlling the flow of gas under pressure to a pneumatic spring supporting a vehicle frame relative to a wheel axle, a housing fixedly secured to the frame, a reciprocal actuating element movable to open at least one valve element controlling said flow, a time delay dashpot directly connected to said element for retarding reciprocation thereof, an actuating lever pivotally secured to said actuating element, spring means centering a point on said lever relative to said housing for permitting floating movement thereof relative to the housing, and means for applying a force to said lever along a line generally parallel to the path of movement of said actuating element and at a point on the lever remote from said actuating element and remote from said point.

5. In a leveling valve for controlling the flow of gas under pressure to a pneumatic spring supporting a vehicle frame relative to a wheel axle, a housing fixedly secured to the frame, a reciprocal actuating element movable to open at least one valve element controlling said flow, a time delay dashpot directly connected to said element for retarding reciprocation thereof, an actuating lever pivotally secured to said actuating element, spring means centering a point on said lever relative to said housing for permitting floating movement thereof relative to the housing, and means for applying a force to said lever along a line generally parallel to the path of movement of said actuating element and at a point on the lever remote from said actuating element and remote from said point, said spring means for centering said lever being applied to said lever at the point thereon on the opposite side of the pivotal connection with said actuating element from the point of force application to said lever.

6. In a leveling valve for controlling the flow of gas under pressure to a pair of pneumatic springs supporting a vehicle frame relative to a pair of spaced vehicle wheel axles, a housing fixedly secured to the frame, a reciprocal actuating element movable to open a pair of separate valve elements controlling said flow, a time delay means directly connected to said element for retarding the reciprocation thereof, an actuating lever pivotally secured to said actuating element about an axis transverse to the longitudinal axis thereof, spring means centering a point on said lever relative to said housing for permitting floating movement thereof relative to the housing, and means for applying a force to said lever along a line generally parallel to the path of movement of said actuating element and at a point on the lever remote from said actuating element and remote from said first mentioned point, said means comprising a link movable in response to the average vertical distance between said two-spaced wheel axles and said frame.

7. In combination, in a leveling system for vehicles, a vehicle frame, a wheel axle, a pneumatic spring supporting said frame over said axle, a valve for controlling the pneumatic pressure in said spring, said valve comprising a housing supported on the frame, a floating lever in said housing having one end thereof connected to said axle for oscillation therewith, a valve controlling the flow of air under pressure to said spring, an element moving transversely of said lever for unseating said valve and pivotally connected to said lever, spring means providing a fulcrum for said lever at a point remote from said element and remote from said one end and resiliently shiftable transversely of said lever, and means retarding movement of said element to prevent movement thereof to unseat said valve in response to movement of said one end of said lever unless said movement is continued for a predetermined length of time.

8. A leveling valve for controlling the flow of fluid under pressure to a fluid spring supporting a vehicle frame relative to a wheel axle comprising, a reciprocal actuating element movable to open at least one valve element controlling said flow, a dashpot directly connected to said actuating element for retarding movement thereof, an actuating lever pivotally secured to said actuating element, a fulcrum on said actuating lever and movable in a path generally parallel to the movement of said actuating element, spring means centering said movable fulcrum for floating movement relative to said frame, and means for applying a force to said lever generally parallel to the movement of said actuating element and at a point on the lever removed from said actuating element, in response to relative movement between said axle and said frame, said fluid comprising a gas.

References Cited in the file of this patent

UNITED STATES PATENTS

| | | |
|---|---|---|
| 1,401,005 | Snyder | Dec. 20, 1921 |
| 2,150,576 | Bell | Mar. 14, 1939 |
| 2,361,575 | Thompson | Oct. 31, 1944 |
| 2,488,288 | Gouirand | Nov. 15, 1949 |
| 2,593,040 | Lloyd | Apr. 15, 1952 |
| 2,670,201 | Rossman | Feb. 23, 1954 |
| 2,843,396 | Lucien | July 15, 1958 |
| 2,844,384 | Jackson | July 22, 1958 |

OTHER REFERENCES

Popular Science Publication, January 1957, pages 125 to 128.